United States Patent [19]

Wegmann

[11] 4,197,222

[45] Apr. 8, 1980

[54] PRINTING INKS/DYE LIQUORS UTILIZING READILY DISPERSIBLE PREPARATIONS OF DYES AND POLYVINYLACETALS

[75] Inventor: Jacques E. Wegmann, Bettingen, Switzerland

[73] Assignee: Ciba-Geigy AG, Switzerland

[21] Appl. No.: 936,186

[22] Filed: Aug. 22, 1978

Related U.S. Application Data

[62] Division of Ser. No. 730,967, Oct. 8, 1976, Pat. No. 4,130,305.

[51] Int. Cl.$^2$ .............................................. C08L 1/28
[52] U.S. Cl. ............................ 260/17 R; 106/308 M; 260/17.4 ST; 260/42.55; 260/42.57; 427/256; 428/195
[58] Field of Search ...................... 260/17 R, 17.4 ST; 427/256; 428/195

[56] References Cited

U.S. PATENT DOCUMENTS

| | | | |
|---|---|---|---|
| 2,534,136 | 12/1950 | Lantz | 260/42.55 |
| 2,649,382 | 8/1953 | Vesce | 260/38 |
| 3,198,647 | 8/1965 | Kress | 106/308 M |
| 3,215,663 | 11/1965 | Weisberg | 260/42.57 |
| 3,925,096 | 12/1975 | Karkov | 260/42.55 |
| 4,127,422 | 11/1978 | Guzi et al. | 260/17.4 ST |

FOREIGN PATENT DOCUMENTS

| | | | |
|---|---|---|---|
| 2540355 | 3/1976 | Fed. Rep. of Germany | 106/308 M |
| 1189026 | 4/1970 | United Kingdom. | |
| 1221126 | 2/1971 | United Kingdom. | |

OTHER PUBLICATIONS

Chem. Absts., vol. 83:194543m, Colored Synthetic Resins, Wegman et al.

*Primary Examiner*—Edward M. Woodberry
*Attorney, Agent, or Firm*—Wenderoth, Lind & Ponack

[57] ABSTRACT

There is described a process for producing readily dispersible, nondusty dye preparations in granulated form, in which process difficultly water-soluble to water-insoluble dyes, pigments or optical brighteners, in a finely dispersed form, and water-insoluble carrier resins from the polyvinylacetal class are added, with vigorous shaking or stirring, to a two-phase system composed of water and a polar organic solvent having only limited solubility in the aqueous phase; the organic phase containing the dye and the carrier resin is dissipated by dilution with water; and the particles of the preparation are separated and freed from the aqueous, solvent-containing phase by rinsing and drying; the preparations which contain transferable dyes are especially useful for preparing a printing ink by dispersion in a liquid medium composed of water or of an organic solvent or of a mixture of water and an organic solvent; the printing inks thus obtained are themselves useful for printing paper which can be used in a transfer printing process.

14 Claims, No Drawings

PRINTING INKS/DYE LIQUORS UTILIZING READILY DISPERSIBLE PREPARATIONS OF DYES AND POLYVINYLACETALS

This is a division of application Ser. No. 730,967 filed Oct. 8, 1976, now U.S. Pat. No. 4,130,305 issued Dec. 19, 1978.

The invention relates to a process for producing preparations of dyes, pigments and optical brighteners, in a nondusty, noncaking granulated form that can be readily very finely and stably dispersed in an organic or organic-aqueous medium by a simple stirring action without the use of dispersing agents, which preparations are produced by reaction with polyvinylacetals as carrier resins. It is possible with the aid of dispersing agents to apply the preparations in a finely dispersed form also from an aqueous medium. The present invention relates also to the production and use of forms of these preparations for dyeing and printing paper and other materials, and to the application of these in transfer printing.

The process for producing the preparations is such that difficulty water-soluble to water-insoluble dyes, inorganic or organic pigments or optical brighteners in a fine form of dispersion are added to a liquid two-phase system of water and a polar organic solvent having only limited solubility therein, at room temperature or up to a temperature which is below the boiling point of the organic solvent being used, with shaking or stirring, with polyvinylacetals as carrier resins; the organic phase is dissipated by dilution with water and, after separation of the aqueous phase, the particles of the preparation are processed by rinsing and drying.

The production of similar preparations by an analogous process has already been described in the Swiss Pat. No. 565,210; however, the preparations concerned are mixed preparations containing, in addition to a polyvinylacetal, a further carrier resin as additive, such as ethylcellulose or a terpene-phenol resin.

It has now been found that dye preparations which contain only polyvinylacetals as carrier resins can be converted just as easily in an organic medium into stable dispersions, and also have the advantage that they introduce less viscosity and furthermore that they render possible a wider application since, in contrast to the combined preparations, they can also be used in an aqueous or organic-aqueous medium.

If moreover the preparations are printed from an organic or aqueous-organic medium, their use has the advantage, compared with the use of printing inks based on ethylcellulose, that the apparatus used for printing can be cleaned with water instead of with solvents, a feature that is to be considered as a considerable simplification of the operating procedure. It is advantageous to add to the water a dispersing agent, for example sodium oleate or soft soap.

Suitable polyvinylacetals are polyvinylformals and actual polyvinylacetals, especially however polyvinylbutyrals, such as are obtainable, e.g., under the tradename Mowital, Pioloform, Rhovinal and Butvar. Suitable for the production of preparations according to the present invention are principally the alcohol-soluble (e.g. ethanol- or isopropanol-soluble) polyvinylbutyrals of low viscosity, i.e. those which have a low degree of polymerisation of, for example, 200 to 2000, especially one of about 500.

It is advantageous to admix the difficulty water-soluble to water-insoluble dyes, pigments or optical brighteners with at least 5 and at most 60 percent by weight, preferably 15 to 40 percent by weight, relative to dye, pigment or optical brightener, of polyvinylacetals.

Preparations having as low a specific viscosity as possible are very important for many applications, particularly for highly concentrated printing inks. This factor can be controlled within certain limits by the content of carrier resin in the preparations. In order to ensure a complete redispersibility of the preparations, it must however be taken into consideration that the requirement of carrier resin becomes greater with increasing fineness of the dye particles. Preparations can be obtained which have a dye content of 40 to 95%, especially one in the range of 60 to 90%. The upper limit is the rule in the case of disperse dyes of which the particle size should be below 5 microns, whereas the lower limit applies for actual pigment preparations of which the particle size should be below 1 micron.

Of particular interest are preparations containing an alcohol-soluble polyvinylbutyral and a pigment having a particle size below 1 micron, the proportion of which is at least 60 and at most 80 percent by weight; or preparations containing an alcohol-soluble polyvinylbutyral and a disperse dye transferable at 160° to 220° C. and having a particle size below 5 microns, the proportion of which is at least 70 and at most 90 percent by weight.

Suitable dyes, difficultly soluble to insoluble in water, for production of preparations with polyvinylacetals according to the present process are undiluted dyes free from water-soluble dispersing agents, especially disperse dyes, particularly such as those which have been described for the thermotransfer printing process. These dyes can belong to the most varied classes: they can be, e.g.: azo and anthraquinone derivatives, heterocycles such as quinophthalones, thiazoleanthrones, anthrapyrimidines, naphthalamides, stilbene dyes and nitro dyes. They may also carry reactive groups. Also suitable are water-insoluble basic, especially deprotonised, dyes, as well as metal-complex dyes in the unmetallised or already metallised form, and optical brighteners.

Suitable pigments are inorganic pigments such as carbon black and titanium white, as well as organic pigments, such as are listed, for example, in "Farbe and Lack (Paint and Lacquer) 80, 1044–1053, 1974". The pigments include also vat dyes in the undiluted form, such as Flavanthron, Dibenzanthron and Indanthron. Particularly important are the unsubstituted or halogenated phthalocyanines.

By difficultly soluble to insoluble is meant a solubility of less than 0.01% at room temperature. In cases where they cannot be dissolved in the organic phase, and they can be dissolved therein only in the rarest of cases since it is necessary to aim at very high concentrations, the fine dispersion has to be achieved by dissolving and reprecipitating and/or by grinding with sand or balls in the aqueous phase or in the organic phase or in mixtures of both. For reasons of economy it is advantageous to grind with the highest possible concentration, whereby the aim should be to achieve concentrations of above 20%, preferably of 40–50%. In order to prevent the viscosity of the dispersion from becoming too high, a condition which would render difficult effective grinding, it is advantageous in grinding in the solvent to concomitantly use smallish amounts of carrier resins, whilst in the case of grinding in water it is appropriate to add fairly small amounts, i.e. about 1-4%, of a water-soluble dispersing agent, such as a condensation product of naphthalene-sulphonic acid and formaldehyde, such as is obtainable commercially, for example, under the name of Tamol NNOK.

Which method is more advantageous, chemical dissolving and reprecipitation from acids or caustic solutions, or grinding in the aqueous or organic phase, has to be determined from case to case by preliminary tests. Of importance is that the various possibilities are available. It may be that grinding in water proceeds much more rapidly and at a much higher concentration; it may also be, however, that only by grinding the dye in the solvent can it be conditioned and prepared in a desired modification necessary for application.

Suitable polar organic solvents for the formation of the second phase are all those solvents which have a limited solubility in water and a so-called miscibility gap, so that in the presence of water there occurs a two-phase system. The solubility should be as high as possible for reasons of economy. It should be at least 1% (=10 g/l), preferably however 10% (=100 g/l), and at most 30%, at room temperature, because after completion of the reaction the two-phase condition of the system has to be dissipated by dilution with water. Since regeneration of the solvents has to be considered as a vital necessity in order to meet the justified requirements for environmental protection, it is to be taken into consideration that with a solubility of only 10 g/l a tenfold greater amount of the solvent/water mixture has to be regenerated by distillation, a procedure that will be undertaken only in compelling circumstances in which a specific solvent has to be employed on technical grounds. It is necessary for the same reasons to strive also for as highly a concentrated grinding of the dye as possible.

Grinding in water does not mean that perhaps solvent can be saved. For reaction with the carrier resin, the dye dispersion has to pass completely and in a fully satisfactory stable deflocculated state into the organic phase. This means that the concentration of dye cannot be higher than if grinding had been performed in the solvent, for which case an upper limit of 50% can be given. The amount of organic phase must hence be at least equal to the employed amount of dye.

Suitable solvents are, e.g., chlorinated hydrocarbons such as methylene chloride, nitriles such as acrylonitrile, nitro compounds such as nitromethane, aldehydes such as furfurol, ethers such as phenylglycol, esters such as ethyl acetate, ketones such as methyl ethyl ketone or methoxyhexanone; alcohols such as n- and sec-butanol and isobutanol, also propylene-carbonate and mixed ether/ester compounds such as ethyl glycol acetate. Also suitable however are those solvents which form only in the presence of electrolytes a two-phase system with water, such as tertiary butanol, methyl glycol acetate, ethylene-carbonate, acetonylacetone or acetol. Appropriate additives, such as sodium chloride, have to be provided in such cases in order that the absolutely essential second phase be formed. It is this which surrounds and hence coats the carrier resin with a thin film of solvent, whereby, after extraction of the solvent by means of water, only the dye dispersed in the carrier resin remains embedded behind. Preferred organic solvents are alcohols, ethers, esters, ketones, aldehydes or a halogen, nitro or nitrile derivative of aliphatic hydrocarbons. The addition of the carrier resin can be made to the solvent or to the aqueous phase. Of importance is that the carrier resin and dye can combine before dissipation of the two-phase system. It is also advantageous to subject the difficulty water-soluble to water-insoluble dyes, pigments or optical brighteners, before the reaction with the carrier resin in one of the two phases, or in a mixture thereof, to a chemical and/or mechanical size-reducing operation until their particle size is below 5 microns, preferably below 1 micron.

In order to be able to coat the maximum possible amount of dye onto the carrier resin, it is advantageous that the carrier resin should be in the form of the smallest particles possible. These do not however have to be as homogeneous in size as possible, as in the case of the particles of the dye, since on application the carrier resin particles, unlike those of the dye, always go into solution. As long as the particles of the carrier resin are relatively large, it is clear that the dye particles will coat the synthetic resin particles; however, if the last-mentioned attain, e.g. by grinding or by dissolving and reprecipitating, likewise dimensions of the order of 1 micron, as in the case of the dye particles, then it is difficult to decide what actually coats what. It is most probable that the particles assume a nagel-fluh-like character. It is important that no large dye aggregates occur which consist only of dye particles and which are not separated by carrier resin particles, because such agglomerations can no longer disperse on their own and can only be divided by the application of shearing forces. Whether or not this is the case is not obvious by looking at the solid particles. Their effective structure is not evident until they have been dispersed in a solvent. Coarse particles of 10 microns and more diameter are as a rule a sign that too little carrier resin has been used; provided of course that grinding has been completely satisfactory. In order to remove impurities and also to ensure a uniform quality, it is to be recommended that the dye dispersion, after completion of grinding and separation of the grinding agents, be filtered, for example through Kunofilter cartridges having a pore-diameter of 5 microns.

As already mentioned, the manner and sequence in which the two liquid phase, necessary for combining the two solid constituents, are brought together are variable to a considerable extent. Of importance is however the clear formation of the liquid two-phase system and the complete passage of dye dispersion and carrier resin into the organic phase. Not until both constituents have become, assisted by vigorous stirring, completely enveloped by solvent and combined with each other, can the organic phase, as a result of successive dilutions with water, be reduced by extraction until practically the whole of the solvent is taken up by the water as the second phase. This dilution process is of decisive significance with regard to the quality of the resulting preparations, and it forms an essential part of the present invention.

The rate at which the diffusion of the solvent into the aqueous phase occurs depends on the degree of grinding and on the nature of the dye. The diffusion can be greatly accelerated by wet grinding of the organic phase which contains the particles of the preparation and is becoming more viscous, for example in a Turmix, whereby simultaneously the desired finely granular form of the preparations can be produced. This grinding operation must however under no circumstances be carried out in the presence of too much water. It is best performed quite near to the saturation limit of the water with the solvent; there is otherwise the danger that the granules which have become hard and completely freed from solvent become too finely ground so that a dusty fine constituent is formed, which has to be removed by sieving. On a production scale, the Turmix apparatus is replaced by apparatus permitting a continuous wet grinding or size-reducing operation to be performed, such as a Gorator apparatus or a perforated disk mill.

Some preparations, particularly high-percentage and less finely ground preparations, break down on dilution practically automatically to form small sand-like granulates. In such cases, an additional mechanical processing can naturally be dispensed with.

After separation of the granulate from the aqueous phase containing solvent, for example on a suction filter, the granulate is rinsed with water and dried. A breaking down is in most cases unncessary. There is obtained directly the ideal commercial form of noncaking, nondusty and abrasion-proof fine granulates of low bulk volume, which nevertheless are readily wettable and dispersible. Compared with spray-dried granulates, those of the present invention constitute a striking advance in the art.

The preparations from dyes, pigments and optical brighteners with polyvinylacetals according to the present process are suitable for various applications. Pigment preparations are principally used for paper printing, for example by the rotary intaglio printing process or the flexographic process, using organic, especially alcoholic or aqueous, printing inks. In the latter case, the preparations have to be predispersed; this can be effected for example by stirring the preparations, optionally premixed with alcohol to form a paste, into a concentrated solution of sodium oleate. Such aqueous preparations can be diluted to any extent with water.

Preparations with disperse dyes or with other dyes transferable by the action of heat, particularly with such dyes that are transferable by sublimation at temperatures of 160°–220° C., are especially suitable for printing, from an organic, aqueous or organic-aqueous medium, auxilary carriers, such as are used for thermotransfer printing, which usually consist of paper or, depending on requirements, also of plastics sheets or metal sheets. The printing design is subsequently transferred, by the action of heat, from such carriers onto textiles, particularly onto polyester and polyamide fibres.

The preparations can be printed on paper by known processes, for example by means of alcoholic (e.g. ethanol or isopropanol) printing inks thickened with, e.g., ethylcellulose. It is however better to produce such printing inks likewise by means of preferably more viscous polyvinylbutyrals. Such inks are considerably more favourable in price; furthermore they exhibit a more advantageous viscosity behaviour, and can therefore be better concentrated with dye preparations in order to use up old inks.

The best systems however are those built up entirely on a base of polyvinylbutyrals.

Such printing inks have a viscosity preferably of at least 15 seconds, especially one in the range of 15 to 100 seconds, in the Ford viscosimeter 4.

For printing from an aqueous medium, for example on rotary film printing machines, the preparations have to be predispersed for example in sodium oleate.

High-percentage, readily dispersible pigment preparations or analogous preparations with disperse dyes in solid form, with a defined particle size and with polyvinylbutyrals as carrier resins, such as can be used for paper printing, are novel and therefore likewise form the subject of the present invention. They are of course most advantageously produced by the process according to the present invention; they can however be produced also by other processes which in themselves are not as good, such as by the solvent-salt kneading process.

Also printing inks and auxiliary carriers for the thermotransfer printing process, which contain besides the preparations with transferable disperse dyes also polyvinylbutyrals as film-forming agents, are new and technically valuable. These form a further subject of the present invention.

It is known from the British Pat. No. 1,221,126 that it is possible to use for the production of organic printing inks suitable for transfer printing the widest variety of natural, synthetic or semi-synthetic resins. In the enumeration which contains and specifies as suitable all resins known from the "Lacquer Raw Material Tables of Karsten, 5th Edition, Hannover", inter alia also polyvinylacetals, only the cellulose ethers have hitherto become recognized and verified as being suitable. The Patent and the appertaining British Pat. Nos. 1,189,026 and 1,190,889 protecting the process and the auxiliary carriers are therefore restricted in their claim to esters and ethers of polysaccharides. It was therefore not to be anticipated that from among the many hundreds of synthetic resins, which has all proved to be either not very suitable or unsuitable, precisely the polyvinylacetals, especially however the alcohol-soluble polyvinylbutyrals, would prove particularly suitable, and even superior to the preferred cellulose derivatives.

In the following Examples, 'parts' denote parts by weight and temperatures are given in degrees Centigrade.

EXAMPLE 1

40 parts of 1-amino-2-chloro-4-oxy-anthraquinone are stirred into a paste in 60 parts of water with the addition of 2 parts of a condensation product of naphthalenesulphonic acid and formaldehyde, and the paste is ground with 200 parts of glass balls of 1 mm diameter until the particle size is below 5 microns. After separation of the glass balls and filtration of the dispersion, the filtrate is stirred up with a solution or dispersion of 4.4 parts of polyvinylbutyral (degree of polymerisation=500) in 80 parts of sec-butanol saturated with water until the precipitating aqueous phase is clear. Dilution is then slowly performed, whilst vigorous stirring is maintained, with a further 220 parts of water; the whole is granulated in a Turmix apparatus; the aqueous phase is filtered off with suction; the residue is stirred up with a further 200 parts of water; filtration under suction is performed and the solvent-free, washed, finely granulated preparation is dried.

5 parts of this preparation, containing 90% of 1-amino-2-chloro-4-oxy-anthraquinone and 10% of polyvinylbutyral, are stirred into 95 parts of a printing ink containing 8 parts of polyvinylbutyral in 92 parts of ethanol. A paper is printed therewith; the printed paper is then dried and pressed in an ironing press at 210° for 30 seconds with the printed side against a polyester fabric, whereupon a red printed design is produced (thermotransfer printing).

A similarly good result is obtained if the same number of parts of the preparation are stirred into a printing ink composed of 8 parts of ethylcellulose and 92 parts of ethanol, with the procedure otherwise being as described.

Analogous results are obtained by using, instead of the above dye, identical parts of other disperse dyes described in the British Pat. No. 1,221,126, with otherwise the same procedure.

The printing ink can be mixed with isopropanol instead of with ethanol.

EXAMPLE 2

28 parts of copper phthalocyanine are ground in 72 parts of sec-butanol saturated with water the addition of 2 parts of polyvinylbutyral, with 200 parts of glass balls of 1 mm diameter until the particle size of the dispersion is below 1 micron. After separation of the glass balls and filtration, the dispersion is stirred up with a further 10 parts of polyvinylbutyral having a degree of polymerisation of 500. Water is then slowly added, with vigorous stirring, until the preparation has precipitated in granular form. The whole is allowed to settle; the overlying liquid is filtered off under suction; water is then added up to the same volume, and the granulate is held by gentle stirring for a further hour in the water. Filtration is performed through a suction filter; the residue is washed with water and the resulting granulate is dried in a vacuum drying chamber at 60°.

1 part of the preparation, containing 70% of copper phthalocyanine and 30% of polyvinylbutyral, is stirred into 1000 parts of an alcoholic printing ink containing 10% of polyvinylbutyral, and a printing is made therewith on a glazed paper. An excellent blue printing is obtained.

Identically good results are obtained with other pigments: for example with Permanentgelb HR (yellow), with Irgalithgelb BKW (yellow), with Flavanthron, with Cromophthalscharlach R (scarlet) or with Cromophthalrot BR (red).

EXAMPLE 3

20 parts of thioindigo are ground in 80 parts of tertiary butanol, for which purpose 200 parts of coarsely granular quartz sand, so-called Ottawa sand, are used. The sand is separated as soon as the particle size of the dispersion is in the range of 1 to 3 microns; the dispersion is filtered and 10 parts of polyvinylbutyral having a degree of polymerisation of 200 are stirred in by using a toothed disc mill. The whole is subsequently slowly stirred up with 100 parts of a 5% aqueous solution of sodium chloride. The overlying aqueous phase is decanted; the residue is stirred with 200 parts of water; filtration under suction is performed and the residue is washed with water; and the resulting granulate is then dried.

10 parts of this preparation, containing 67% of thioindigo and 33% of polyvinylbutyral, are stirred with 90 parts of a 15% aqueous sodium oleate solution by means of a high-speed stirrer. 50 parts of this dispersion are stirred into 50 parts of a 4% sodium alginate thickening, and a paper web is printed therewith. The paper is dried and transfer printing is performed, in the manner described in Example 1, on a polyester fabric, whereby a brilliant red printing is obtained.

EXAMPLE 4

20 parts of one of the dye preparations mentioned in Example 1 are dispersed together with 2 parts of polyvinylbutyral in 50 parts of ethanol. After 15 minutes' stirring, the printing ink is slowly made up, with stirring, by the addition of water to 100 parts. A glazed paper is printed with this printing ink and dried in air. The printed paper is fast to wiping and to rubbing, and can be stored in the rolled-up condition. It is suitable for thermotransfer printing on synthetic fibres, such as polyester and polyamide fibres. The apparatus used for printing can be cleaned with water (instead of with solvents) with the addition of potash soap.

I claim:

1. Printing inks or dye liquors produced by admixing:
   (a) a readily dispersible, non-dusty dye preparation in particulate form produced by a process which consists essentially of:
   i. forming a dispersion of a difficultly water soluble to water insoluble dye, pigment or optical brightener with 5 to 60% by weight, based on the weight of said dye, pigment or optical brightener, of a water insoluble polyvinylacetal carrier resin and a polar organic solvent soluble in water between 1 and 30% on a weight/volume basis;
   ii. adding water to the dispersion of a., under vigorous agitation whereby the particles of said dye, pigment or optical brightener are precipitated;
   iii. separating said particles from said water and organic solvent and then;
   iv. rinsing and drying said particles;
   (b) a polysaccharide ester or ether, a polyvinylacetal or both.

2. Printing ink according to claim 1 wherein component (c) is dissolved in an organic solvent.

3. Printing ink according to claim 2 wherein the organic solvent is a lower alcohol.

4. Printing ink according to claim 2 wherein the lower alcohol is ethanol or isopropanol.

5. Printing ink according to claim 1 wherein the polyvinyl acetal is polyvinylbutyral.

6. Printing ink according to claim 1 wherein the polysaccharide ester or ether is in dissolved form in an amount of no more than 50% relative to the proportion of dye, pigment or optical brightener.

7. Printing ink according to claim 6 wherein the polysaccharide ester or ether is in dissolved form in an amount of no more than 10 to 25% relative to the proportion of dye, pigment or optical brightener.

8. Printing ink according to claim 1 wherein a dye transferrable by the action of heat is employed.

9. Printing ink according to claim 1 wherein the ink has a viscosity of at least 15 seconds in the Ford viscosimeter.

10. Printing ink according to claim 1 wherein the ink has a viscosity of at least 15-100 seconds in the Ford viscosimeter.

11. An organic ink according to claim 3 which consists essentially of a polyvinylacetal and a lower alcohol.

12. The organic ink according to claim 11 wherein said lower alcohol is isopropanol.

13. A printing ink according to claim 1 which additionally comprises a fatty acid salt.

14. The aqueous printing ink according to claim 13 wherein said fatty acid salt is sodium oleate.

* * * * *